US012333479B2

(12) United States Patent
Conlon et al.

(10) Patent No.: US 12,333,479 B2
(45) Date of Patent: Jun. 17, 2025

(54) SHIPMENT TRACKING SYSTEM PROVIDING MONITORING OF ACCESS TO A CLOSED SHIPPING CONTAINER OR CARGO SPACE UTILIZING LOCALLY-DEPLOYED ACCESS REPORTING AND MONITORING DEVICES

(71) Applicant: OVERHAUL GROUP, INC., Austin, TX (US)

(72) Inventors: Barry Conlon, Leander, TX (US); Nicholas Heikkinen, Rowlett, TX (US)

(73) Assignee: Overhaul Group, Inc., Austin, TX (US)

( * ) Notice: Subject to any disclaimer, the term of this patent is extended or adjusted under 35 U.S.C. 154(b) by 0 days.

(21) Appl. No.: 18/185,350

(22) Filed: Mar. 16, 2023

(65) Prior Publication Data

US 2023/0297938 A1    Sep. 21, 2023

Related U.S. Application Data

(60) Provisional application No. 63/320,486, filed on Mar. 16, 2022.

(51) Int. Cl.
*G06Q 10/0833*  (2023.01)
*B65D 55/14*  (2006.01)
*B65D 90/48*  (2006.01)

(52) U.S. Cl.
CPC ......... *G06Q 10/0833* (2013.01); *B65D 55/14* (2013.01); *B65D 90/48* (2013.01); *B65D 2590/0083* (2013.01); *B65D 2590/666* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS 5,298,884 A    3/1994   Gilmore et al.
2003/0052782 A1    3/2003   Maloney
(Continued)

OTHER PUBLICATIONS

AmericanSeals.com; webarchive screengran of Jul. 9, 2020, available at: https://web.archive.org/web/20200709205422/https://www.americanseals.com/product/pull-tight-cable-seal-model-joeguard-78inch/ (Year: 2020).*

(Continued)

*Primary Examiner* — Emmett K. Walsh
(74) *Attorney, Agent, or Firm* — Isidore PLLC

(57) ABSTRACT

A method includes receiving, at a server, a first message including identifying information about a container with an access door seal being monitored by a first ARM device. The method includes initiating tracking of the shipment and first ARM device. The method includes, in response to receiving a second ARM device message indicating an unsealed status of the access door being monitored, comparing the actual time and location at which the ARM device detected unsealing of the access door to the expected unseal time and location. The method includes, in response to the actual time and location not being within a threshold range of the expected time and location, determining that an unexpected/unscheduled unseal event has occurred with the shipping container. The method includes generating and transmitting notifications alerting the operator and at least one interested party identified with the shipment of an unexpected/unscheduled unseal event.

18 Claims, 9 Drawing Sheets

(56) References Cited

U.S. PATENT DOCUMENTS

| | | | |
|---|---|---|---|
| 2004/0041705 A1 | 3/2004 | Auerbach et al. | |
| 2005/0231365 A1 | 10/2005 | Tester et al. | |
| 2006/0202824 A1 | 9/2006 | Carroll et al. | |
| 2013/0342343 A1* | 12/2013 | Harring | G09B 29/102 340/521 |
| 2016/0238406 A1* | 8/2016 | Burtner | G06F 16/22 |
| 2018/0040224 A1* | 2/2018 | Barcala | G06Q 10/0833 |
| 2019/0027069 A1* | 1/2019 | Meyers | G09F 3/0317 |
| 2019/0130351 A1* | 5/2019 | Arena | G06Q 10/0833 |
| 2020/0019931 A1* | 1/2020 | Prabhakar | H04W 12/126 |

OTHER PUBLICATIONS

AirbrakeSecurity.com; webarchive screengrab of Aug. 13, 2020, available at: https://web.archive.org/web/20200813201745/https://www.airbrakesecurity.com/page.php/MS-BAR11 (Year: 2020).*

ShippingandFreightResource.com; "How to seal a shipping container and how many seals it should have", available at: https://www.shippingandfreightresource.com/how-to-seal-a-shipping-container/, Mar. 14, 2018 (Year: 2018).*

AmericanSeals.com; webarchive screengrab of Jul. 9, 2020, available at: https://web.archive.org/web/20200709205422/https://www.americanseals.com/product/pull-tight-cable-seal-model-joeguard-78inch/ (Year: 2020).*

System Loco Ltd., "System Loco—Loco Tag, Product Data Sheet", System Loco Ltd., Parkfield, Greaves road, Lancaster. LA1 4TZ; www.systemloco.com; 2 pages.

* cited by examiner

| BLE-ENABLED ARM DEVICE ACCESS/EVENT LOG 385 ||||||
|---|---|---|---|---|---|
| Detected Event | Code | BT Hash | Date | Time | Location (GPS) |
| BLE Device ID | OEM_Unique ID/Customer Batch ID | | | | |
| BLE Activated | 1000 | Hash1 | 3/10/2022 | 8:15:23 | Location Data1 |
| Cable Cut | 1111 | XYZ11 | 3/15/2022 | 16:15:03 | Location Data2 |
| Cable loosened | 1010 | Hash3 | | | Location Data3 |
| Tampering/Open | 1020 | | | | |
| Movement | 1025 | | | | Location Data5 |
| RSSI below TH | 1030 | | | | |
| Battery Low | 1040 | Hash7 | 3/30/2022 | 14:23:39 | Location Data7 |
| Battery Range | 2000 | | | | |

FIG. 3B

SHIPMENT TRACKING SYSTEM PROVIDING MONITORING OF ACCESS TO A CLOSED SHIPPING CONTAINER OR CARGO SPACE UTILIZING LOCALLY-DEPLOYED ACCESS REPORTING AND MONITORING DEVICES

PRIORITY & RELATED APPLICATIONS

The present application claims priority from U.S. Provisional Application No. 63/320,486, filed on Mar. 16, 2022, with the entire content of that provisional application being incorporated herein.

BACKGROUND OF THE INVENTION

1. Field of the Invention

The present disclosure is generally related to security systems for transportable goods, an in particular to a system, a method, and a device for securing cargo during shipment in a closed container.

2. Description of the Related Art

Within the trucking and shipping industries, cargo containers are widely used to transport goods. Access to the interior of these containers is provided via two panel doors affixed by hinges at opposed sides of the rear of the container. In order to secure the interior space of the container, the panel doors swing inwards to the middle of the rear of the container, and each panel door is secured in place using one or more lockrods extending vertically from a top to a bottom of the panel door. The top and/or bottom ends of the lockrods are configured as cams that engages with cam keepers that are affixed to a top and bottom frame of the container. The lockrods include levers that operate as rotatable door handles.

In order to lock the door panels in place, the door handles are rotated to align horizontally against or in the direction parallel to the door panel surface. Rotation of the door handle from the open position into the locked position causes the cams to be interlocked with the cam keepers, preventing the panel doors from opening. The ends of the door handles are received into door handle retaining latches that are bolted or riveted to the door panel and which slide over the door handle to prevent movement of the door handle when in this locked position.

Goods/cargo transported in these containers are susceptible to being stolen or tampered with once the container leaves its secure origination point and is in transit to a destination. Typically, these events involve the opening of the container door, often without the knowledge of driver/operator. The breach/opening of the container to complete the theft or tampering of the cargo can go undiscovered and unreported until the transporting vessel arrives at the end destination.

SUMMARY

The disclosed embodiments provide a system, a device, and a method for identifying and responding to unauthorized/unexpected access to a closed container or cargo space holding a good/cargo being transported by an operator in a transport vessel from an origination point to a destination. According to one aspect, a container access door sealing and monitoring (CADSM) system is provided. The CADSM system includes a shipment monitoring service (SMS) server which performs the sever-level functional features of the CADSM system. The SMS server includes a memory having stored thereon program instructions for enabling the concurrent tracking of a plurality of different shipments each comprising cargo in a sealable container being transported by one or more operators of one or more transport vessels from an origination point to at least one destination point, the program instructions further comprising an access reporting and monitoring (ARM) device monitoring module for tracking and reporting on an operating state of a plurality of ARM devices, each deployed with a respective sealable container to track a sealed and unsealed state of an access/locking mechanism (e.g., a door latching system) of the container. The SMS server includes a communication subsystem that enables the SMS server to communicatively connect via one or more networks to secondary devices including a first intermediary communication device co-located with a first container having a first ARM device assigned to monitor the access seal of the first container, the first intermediary communication device communicatively connected to the first ARM device and receives ARM device status information and seal/unseal messages via short range wireless communication from the first ARM device and reports a sealed and unsealed status of the access door, as detected by ARM device, within messages transmitted to the SMS server. The SMS server also includes a processor communicatively connected to the memory and to the communication subsystem.

The processor processes the program instructions, which configures the SMS server to receive a first ARM device message comprising an identifier (ID) of the first ARM device, a time and location at which the first ARM device was activated, and identifying information about a container with an access door seal being monitored by the first ARM device, and operator information. In response to receiving a second ARM device message tagged with the ID of the first ARM device, where the second ARM device message indicates an unsealed status of the access door being monitored by the first ARM device, the processor parses the second ARM device message for information related to an actual time and location at which the ARM device detected the unsealing of the access door. The processor compares the actual time and location to the expected time and location. In response to the actual time and location not being within a threshold range of the expected time and location, the processor: determines that at least one of an unexpected and an unscheduled unseal event has occurred with the shipping container; and generates and transmits notifications alerting at least one interested party identified with the shipment and the operator of the unexpected or unscheduled unseal event.

In one or more embodiments, in transmitting the notifications, the processor configures the SMS server to transmit an alert to a mobile terminal of the operator, the alert indicating a potential theft of the cargo (i.e., content within the container). In one or more embodiments, in transmitting the notifications, the processor configures the SMS server to transmit a request to the operator to capture and provide one or more pictures or video of the access door, cable seal, and ARM device in real time and provide secondary information to confirm whether the access door monitored by the AMR device was unsealed and whether the cargo has been tampered with or stolen. In one or more embodiments, the processor further configures the SMS server to, in response to receiving the one or more pictures or video and the secondary information indicating the access door was unsealed, generate an incident report to include the pictures and video and secondary information and the actual time and location the event was detected. The processor configures the SMS server to transmit the incident report to at least one additional interested party from among a group that includes a shipper, a recipient of the cargo, an insurance company, and law enforcement. The processor updates the repository with details of the incident report.

In one or more embodiments, the processor stores information from the first ARM device message in a repository, along with an indication of an expected location and time at which the first ARM device should report the container access door being unsealed. The processor initiates tracking of the shipment and associated first ARM device as a shipment monitoring security function.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3B provides an example event data log of an ARM device, presenting a log of events related to the sealing and subsequent access(es) to a shipment container to which the ARM device is attached as an access monitoring seal, according to one or more embodiments;

DESCRIPTION OF THE ILLUSTRATIVE EMBODIMENTS

Figure 1A:
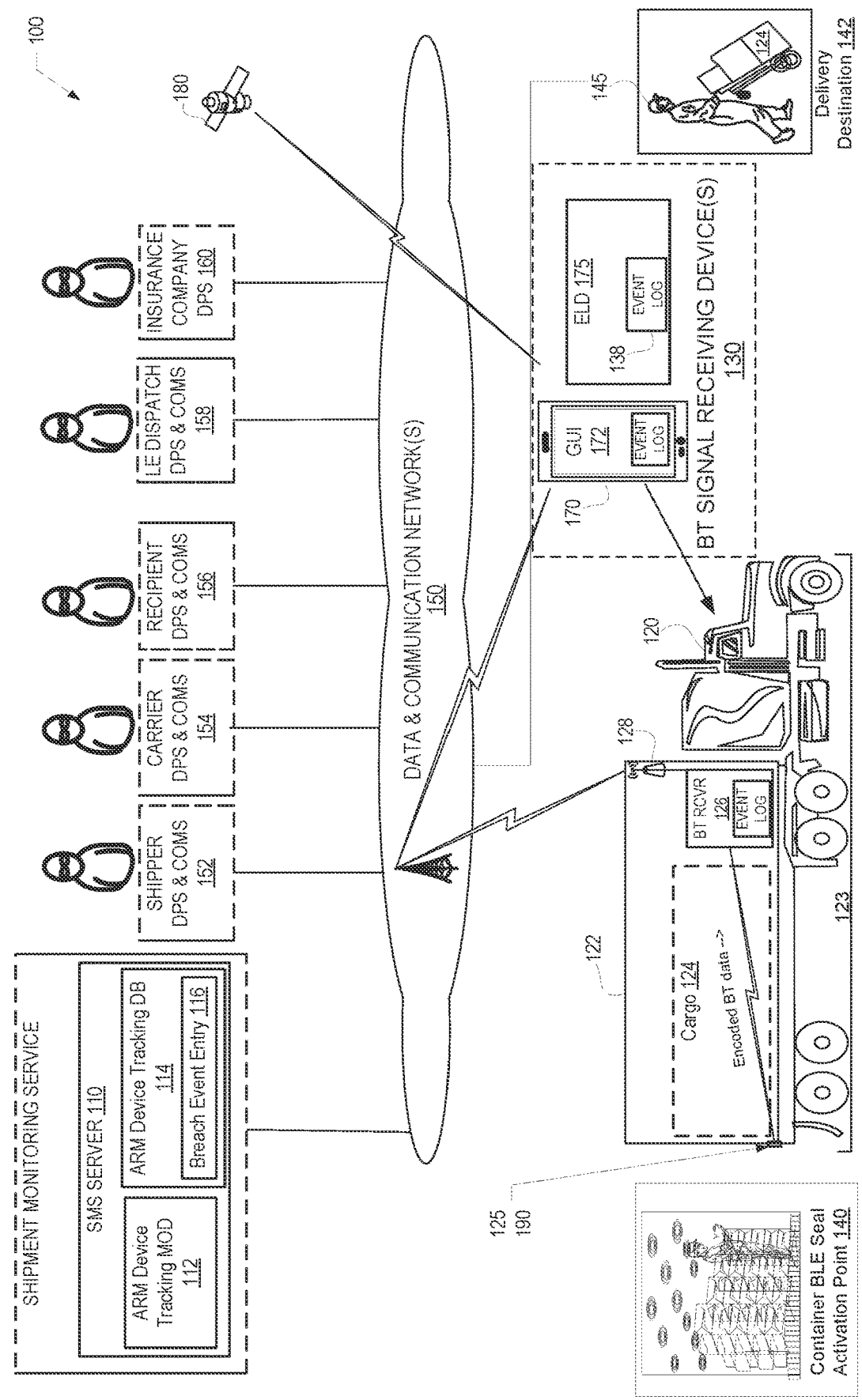
FIG. 1A depicts an example shipment tracking environment having a shipment monitoring system (SMS) server and an access reporting and monitoring (ARM) device deployed on an access door of a shipping container, and within which various aspects of the disclosure can be implemented, according to one or more embodiments.

The disclosed embodiments of the disclosure provide a system, a device, and a method for identifying and responding to unauthorized/unexpected access to a closed container or cargo space holding a good/cargo being transported by an operator in a transport vessel from an origination point to a destination. Specific embodiments provide a shipment monitoring service (SMS) server that receives event data from an access reporting and monitoring (ARM) device that performs an access monitoring and reporting function for an access door to the shipping container system that is sealed during transit. The embodiments further provide a method for using the ARM device with a cable seal to monitor and report incidents related to un-scheduled accessing of the access door to a shipping or storage container or to a closed mobile storage space.

In the shipping industry where the majority of shipments are transported via shipping containers, having knowledge of when and where a container is opened is an important aspect in providing security of shipments, particularly to reduce the events of possible loss or tampering with transported goods that can occur at some point during transit. However, this in-shipment information has conventionally not been readily available to those involved in the shipment industry. With the ever-increasing concern over the security of goods that are being transported in these containers, some advancements have been made to allow for monitoring of the opening of the container doors. One such product provides a CDMA-based cellular device that is attached to a bolt inserted through a hole in the top and bottom latches that retain the door handles of the container. The bolt further extends through a hole in the outer frame of the container and is secured so as to prevent the CDMA-based cellular device from being removed without cutting the bolt. The cellular device sends/transmits a cellular signal to a central location using CDMA-based transmission whenever the bolt is cut and the cellular device is removed.

Drawbacks with this implementation of the CDMA-based cellular device are that the top latch of the door handle retaining latches is secured to the door panel using a rivet or bolt. However, the rivet or bolt can be detached from the door panel, releasing the door handle to rotate freely to open the door, while the CDMA device is still "securely attached" to the door handle and/or retaining latch. Thus, the security provided by the CDMA-based device is easily bypassed by simply using a tool to remove the rivet or bolt holding the door handle retaining latches, and the device is not triggered to report the opening of the container door. Additional drawbacks include the high costs involved with manufacturing these CDMA devices, which makes the device less desirable and/or financially impractical for operators having a large number of containers.

Accordingly, the disclosed embodiments provide a system, a device, and a method for identifying and reporting, in real-time, any opening of (or access to) a closed container or cargo space holding goods/cargo being transported by an operator in a transport vessel from an origination point to a destination.

As provided within the disclosure, it is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Throughout the description, the term shipment refers primarily to the transportation of cargo via a transport vessel from an origination point (shipper) to a delivery or destination point. Several other terms utilized throughout the disclosure are provided with functional descriptive names that represent the meanings and/or the context in which the terms are presented and/or utilized. Within the description of the features of the disclosure and the accompanying drawings, the embodiments are presented from the perspective of a tractor-trailer based shipment environment, where a "shipment" includes a cargo being transported within a container by a transport vessel, such as a tractor-trailer. It is appreciated that while presented as a tractor-trailer styled vehicle, the disclosure extends to different types of on-terrain transport equipment available, including, but not limited to, flatbeds, dry vans, refrigerated trucks, trains, etc. It is understood that the features and functionality described herein can also be applicable to different types of on-land motorized equipment, such as cars, RVs, busses, motorcycles, and the like, without limitation. Further, the vessel can, in some instances, be non-motorized vehicles, such as bicycles and other non-motorized form of transportation.

Additionally, the disclosure utilizes the term "vessel" in order to also account for non-terrain cargo transportation, such as via airplanes and watercrafts and drones. These "vessels" can also be controlled by an operator and be involved in one or more un authorized or unscheduled access events. The underlying features of the disclosure are thus fully applicable to other transportation and/shipping spaces, such as water-based shipping (e.g., ocean cargo or river cargo), where the operators are ship captains, the vessel is either a floating vessel or an amphibious vessel. Air based transportation is also a supported space that can include a framework designed for interfacing by air-based cargo shippers, with the operators being the pilots of the planes, etc.

For simplicity and completeness, the disclosure is described from the perspective of a shipment that includes a cargo being transported over ground by a transport vessel that is a tractor-trailer, where the operator is the driver. Notably, certain aspects of the disclosure have general applicability to situations that are not shipment related. Also, while the illustrated embodiment and descriptions are presented primarily from the perspective of a cargo container, the inventive concepts find applicability and can be extended to other environments and uses. For example, the use of the AMR device can be extended to vales within the oil and gas industry, chain link access gates, etc. that require a seal and some low costs security mechanism to track and report when the access seal is broken.

The majority of the terms utilized herein are generally known to those in the shipping industry. Certain coined terms are utilized herein in describing the features and functionality of the disclosure. For example, the term "shipment-related entity" if/where utilized references each of the following, without limitation: a cargo, a cargo container, a tractor (e.g., a motorized vehicle/vessel), a trailer (e.g., a wheeled container), a tractor-trailer combination, a transport vessel, a driver/operator, and an operator mobile communication device (MCD) and an ARM device. One or more of the shipment-related entities is provided with a location tracking mechanism, such as a GPS transponder, which enables the geographic location of the collective shipment (i.e., all entities for a single shipment) to be determined.

Within the disclosure, the term relevant party refers to and/or can include one or more, or all of, the owner of the cargo, the shipper, the owner of the transport vessel, if different from the operator, the intended recipient of the cargo, an insurance company that insures one or more of the shipment-related entities, an attorney representing one or more of these other parties, and others with a vested interest in the cargo and/or the transport vessel, and/or the operator. Also, as presented within the description of the disclosure, the terms event or access event are broadly utilized to represent events that are identified by message signals transmitted from the ARM device. The events include a first event detected at the time the seal is originally applied to the access door, which can trigger a concurrent activation of the ARM device activation, in one embodiment. The events include a second or final event detected at the time the seal is opened, cut off, and/or no longer being used to secure the access door. This may include events corresponding to the seal tracking being turned off by the operator (or person with security access to turn off the ARM device reporting features). The receipt of an ARM device message or signal indicating that the unseal event has occurred can be considered an emergency or heightened alert situation and can trigger various different responses by the ARM device and the SMS server, in one or more embodiments. According to one or more embodiments, each event type can have a different list of relevant parties. For example, the insurance agent may only be relevant for theft events (e.g., unsealing of the container doors, with possible removal of the cargo, before the vessel arrives at the intended destination) where there is financial liability that has to be covered by the insurance company.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The attached figures present various aspects and/or features of the described embodiments; however, certain features may not be expressly presented within the figures and/or the description thereof. Within the descriptions of the different views of the figures, similar elements are provided similar names and reference numerals as those of the previous figure(s). The descriptions of the illustrative embodiments are therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Those of ordinary skill in the art will appreciate that the hardware, firmware/software utility, and software components and basic configuration thereof depicted in the following figures may vary. For example, the illustrative components of example SMS server 110 (FIGS. 1 and 2) or example ARM device 125 (FIG. 4) are not intended to be exhaustive, but rather are representative to highlight some of the components that can be utilized to implement certain of the described embodiments. For example, different configurations of ARM device 125 may be provided, containing other devices/mechanism/components/features, which may be used in addition to or in place of the hardware depicted and/or described, and the devices may be differently configured. The depicted examples are therefore not meant to imply architectural, usage, or other limitations with respect to the presently described embodiments and/or the concepts of the general disclosure.

Referring now to the figures, FIG. 1A depicts an example shipment tracking environment 100 having a shipment monitoring system (SMS) server and an access reporting and monitoring (ARM) device deployed on an access door of a shipping container, and within which various aspects of the disclosure can be implemented, according to one or more embodiments. Shipment tracking environment 100 provides a communication infrastructure interconnecting various devices that collectively enable the various features of the disclosure. Shipment tracking environment 100 generally includes a distributed data processing system (DPS) which provides shipment monitoring system (SMS) server 110. SMS server 110 generally operates to track a plurality of shipments traversing one or more geographical areas in a plurality of shipping vessels. SMS server 110 includes ARM device tracking module 112 and an associated ARM device tracking database (DB) 114 (or ARM data repository 114). An example entry 116 is shown within ARM DB 114. AMR device tracking module 112 executes on device processor to configure SMS server 110 to perform the various server-level features described herein.

Shipment tracking environment 100 also includes data and communication network 150. Data/Communication network 150 includes a plurality of network communication devices and subnetworks that enable voice, data, and other forms of communication between two or more entities that connect to data/communication network 150. Data/Communication network 150 supports transmission of wirelessly-communicated signals via intermediary network devices, such as network nodes, e.g., evolution Node B (eNodeB), and access points. Data/Communication network 150 can include cloud storage for storing relevant carrier and shipping data and other historical data, including ARM device event data, as one example. SMS server 110 communicatively connects with other devices over data/communication network 150 via a network communication subsystem. In one embodiment, SMS server 110 facilitates or supports download of a shipment tracking application onto an operator mobile terminal (or MCD) 170 to enable the local operator mobile terminal to interface with other devices and perform certain of the features and functionality supported/provided by the shipment tracking system. Data/communication network 150 enables communication of seal/unseal events and notifications, ARM device location signals, and other data and/or information between ARM device 125, SMS server 110, operator mobile terminal 170, and other network-connected devices. Shipment tracking environment 100 further includes global positioning system (GPS) satellite 180 as one methodology utilized to identify/determine a current geographical location of any one of shipment-related entities, as described herein. Data/communication network 150 of shipment tracking environment 100 provides communication links to a plurality of DPSs associated with a plurality of different shipment related devices, including shipper DPS 152, carrier DPS 154, cargo recipient DPS 156, law enforcement dispatch DPS 158, and insurance company DPS 160. One or more of these shipment related entities may monitor the shipment of cargo 124 from shipment origination point 140 to shipment delivery destination 142. In the presented embodiment, shipment origination point 140 doubles as the ARM device activation point 140 at which the cargo container is locked and secured by attaching the ARM device 125 to seal the locking mechanism in a manner that would require the seal be broken in order to open the door to the container and access the cargo placed therein. The cargo (or shipment) 124 is transported to a delivery destination 142 via one or more shipping routes. Data/communication network 150 of shipment tracking environment 100 enables efficient communication with operators 145 and supports the monitoring and tracking of the various shipment-related entities, which may be within a shipment group.

As presented, the shipment-related entities include cargo 124, being transported in/via tractor-trailer 120, driven by operator 145, who has operator mobile communication device (MCD) (or mobile terminal) 170. In the illustrated embodiment, tractor-trailer 120 is transporting a container 122, which has access doors that are secured using an ARM device 125. In one embodiment, ARM device 125 transmits the seal/unsealed event data to a wireless transceiver 128 installed/embedded within the container 122 (or the transport vessel). The wireless transceiver communicates the seal/unsealed data to SMS server 110 via communication network 150. In one or more alternate embodiments, ARM device 125 transmits the seal/unsealed event data to the operator mobile terminal 170 or an electronic logging device 175 that is in communication range of the ARM device 125. Each of wireless transceiver and operator mobile terminal 170 or electronic logging device 175 operate as an intermediary communication device, referred to herein as BT signal receiving device(s) 130. According to one aspect, SMS server 110 can respond to this automated notification of a detected early unseal event by instantiating a communication with the operator MCD 170 to obtain additional details about what is occurring or has occurred to trigger the early unseal event. The operator's mobile terminal 170 is configured with one or more applications, which enables the direct receiving and transmitting of the ARM device messages. As described later, these applications can generate one or more user interfaces (UIs) 172 with notifications and/or selectable interfacing options presented to the operator, as described in greater detail within the description of FIGS. 5A and 5B. Additional features of this automated response process are provided in the below description of the disclosure.

Figure 1B:
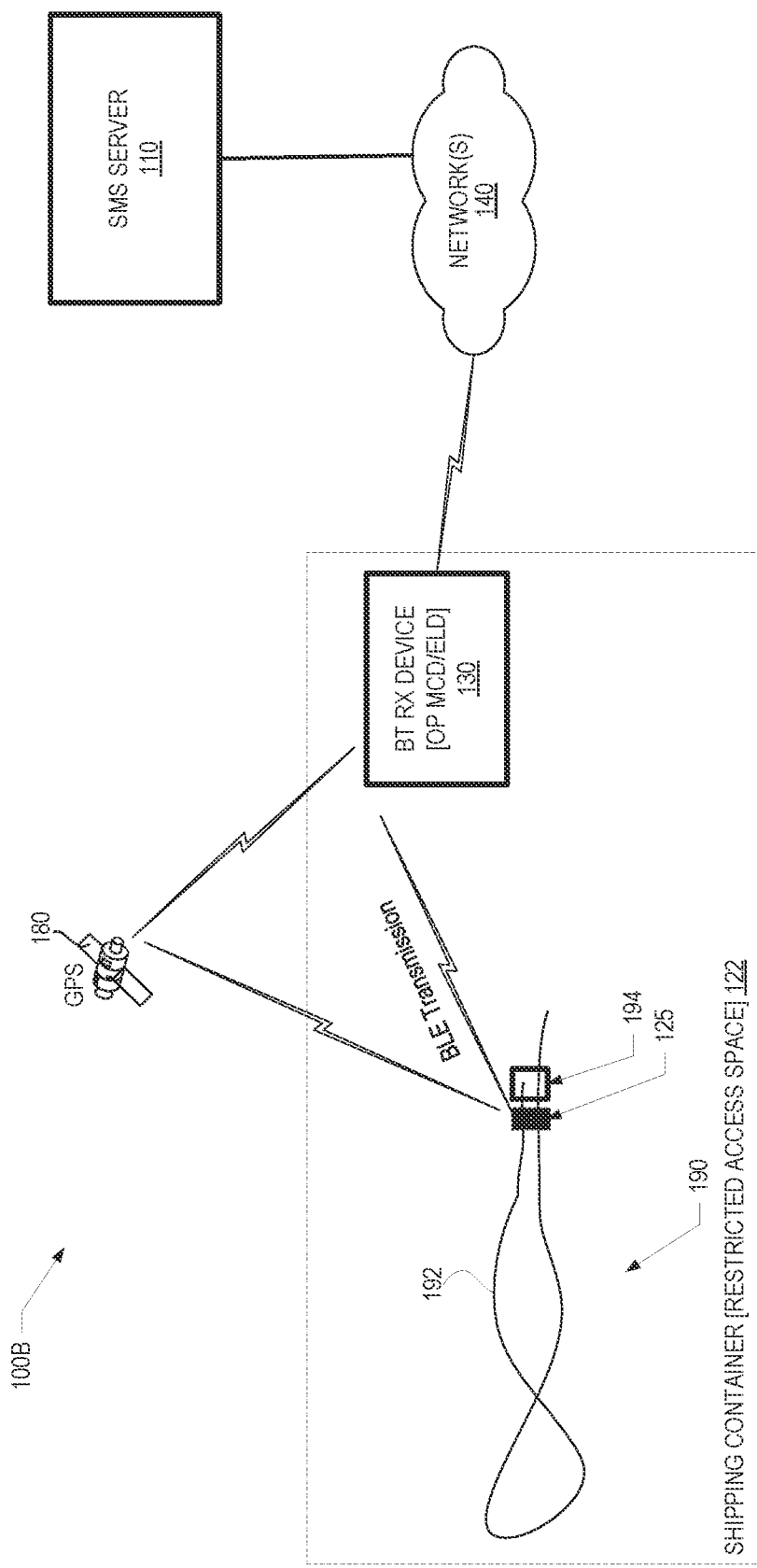
FIG. 1B illustrates an example signal transmission diagram of a shipment monitoring system within which a Bluetooth-enabled ARM device is deployed as a part of a cable locking security system for a shipping container, according to one or more embodiments.

FIG. 1B illustrates an example signal transmission diagram of a shipment seal monitoring environment system 200 within which a Bluetooth-enabled ARM device 125 is deployed as a part of a cable locking security system 190 for a shipping container 122, according to one or more embodiments. As shown within FIG. 1B, cable locking security system 190 includes a high tensile strength cable 192 and cable locking mechanism 194 along with ARM device 125. ARM device 125 transmits a BLE signal to an intermediary device 130, such as operator mobile terminal 170 or ELD 175, which each include a BT receiver. The intermediary device 130 communicates via the data and communication network 150 with SMS server 110. GPS satellite 180 provides location data to ARM device 125 and/or intermediary device 130 enabling the devices to report their location within the seal/unseal data transmissions that are generated and communicated to SMS server 110.

Figure 2:
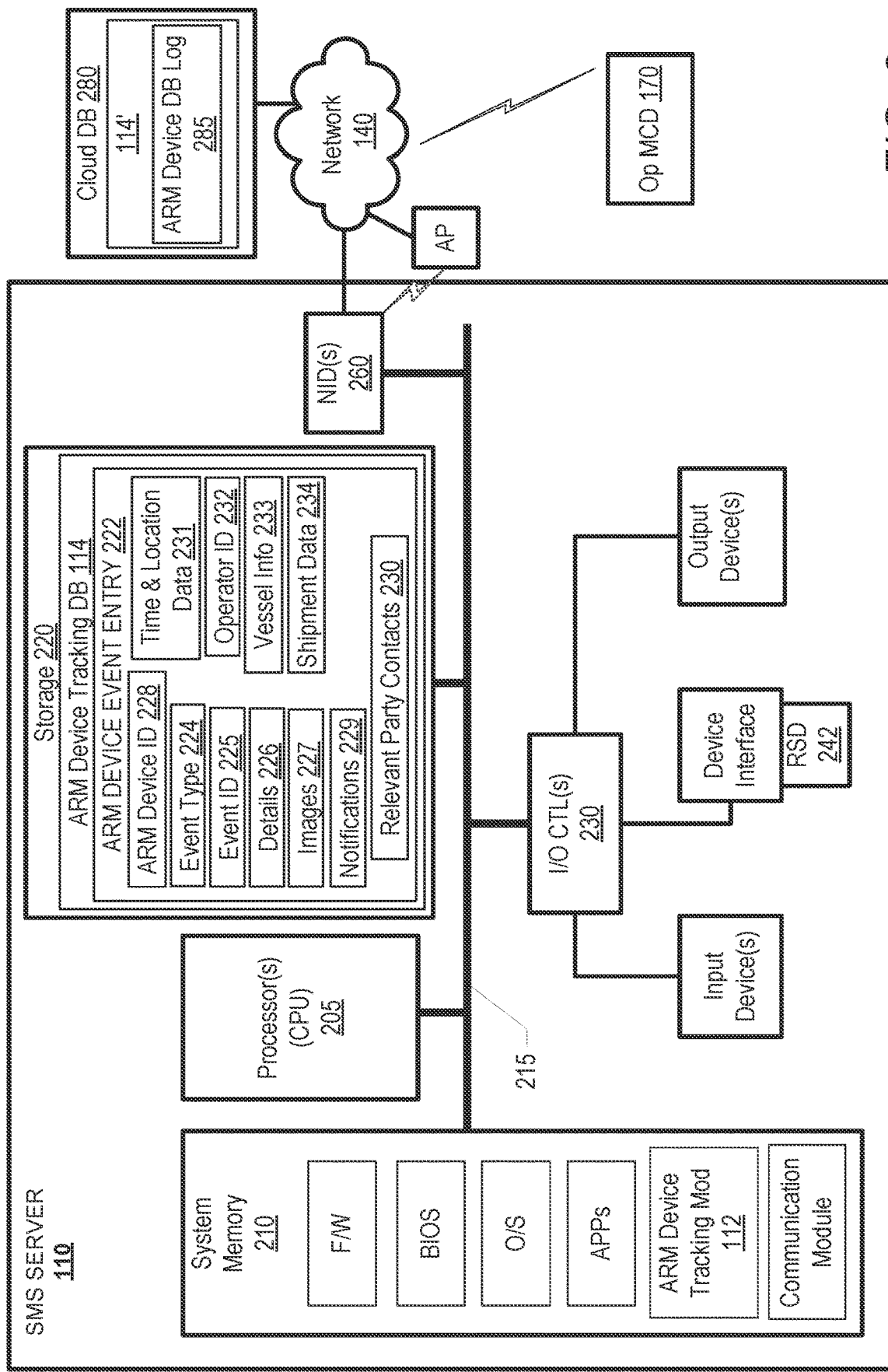
FIG. 2 is a block diagram representation of an example SMS server within which various aspects of the disclosure can be implemented, according to one or more embodiments.

Turning now to FIG. 2, there is illustrated a block diagram representation of an example SMS Server 110 within which various aspects of the disclosure can be implemented, according to one or more embodiments. SMS server 110 can be one server within a cluster of servers, where the servers can be co-located in a single location and/or geographically dispersed over a plurality of locations in a distributed system. In other embodiments, SMS server 110 can be any electronic device such as, but not limited to, a desktop computer, notebook computer, or a single server. Additionally, in one embodiment, SMS server 110 can be implemented as a virtual machine sharing hardware resources of a physical server. In one embodiment, SMS server 110 operates as a networked computing device providing a cloud infrastructure that supports implementation of a carrier and shipper interfacing and shipment tracking (CSIST) framework. Generally, SMS server 110 can operate as both a data aggregator and/or a monitoring center computer. As a data aggregator, SMS server 110 receives additional amounts of information from shipment-related entities to enable other features and functionalities. As a monitoring center computer, SMS server 110 can be configured with additional software and firmware modules and components for receiving data, generating notifications, and responding to detected conditions within a shipment monitoring environment. For purposes of this disclosure, SMS server 110 is representative of SMS server 110 and is interchangeably referred to as SMS server herein. It is appreciated that, as shown within FIG. 2, SMS server 110 can simply be any SMS server equipped with ARM device tracking (and responding) module 112 and corresponding ARM device event tracking DB (or repository) 114.

Example SMS server 110 includes at least one processor, and potentially a plurality of processors, generally referenced hereinafter as central processing unit (CPU) 205. CPU 205 is coupled to system memory 210, non-volatile storage 220, and input/output (I/O) controllers 240 via system interconnect 215. System interconnect 215 can be interchangeably referred to as a system bus, in one or more embodiments. One or more software and/or firmware modules can be loaded into system memory 210 (from storage 220 or other source) during operation of SMS server 110. Specifically, in the illustrative embodiment, system memory 210 is shown having therein a plurality of software/firmware modules, including firmware (F/W), basic input/output system (BIOS), operating system (OS), and application(s). Additionally, system memory 210 includes ARM device tracking module 112 and communication module 216. While shown as a separate component, ARM device tracking module 112 can, in alternate embodiments, be provided as one of the applications and/or as an executable module within F/W, for example. The software and/or firmware modules within system memory 210 enable SMS server 110 to provide varying features and functionality when their corresponding program code is executed by CPU 205 or by secondary processing devices (not specifically shown) within SMS server 110.

Local storage 220 stores a local copy of ARM device event tracking DB 114, which is a repository of data related to the events reported by one or more intermediate devices 130, such as operator mobile terminal 170 within the larger shipment tracking environment. ARM device tracking DB 114 includes a plurality of ARM device entries, each tagged with a specific unique ID assigned to the corresponding ARM device 125. Example ARM device entry 222 is illustrated. As shown, ARM device entry 222 includes the following data/information, without limitation: ARM device unique ID 223, event type 224, event ID 225, operator entered details 226, operator captured images 227, audio files 228, event notifications 229, time and location data 231, operator ID 232, vessel information 233, shipment data 234, and relevant party contacts 230. Remote cloud DB 280 includes remote copy of ARM device tracking database/repository 114".

Relevant party contacts 230 includes a listing and electronic contact information of each party associated with the particular shipment, including those parties indicated by corresponding DPSs 152-160 within FIG. 1A. In one or more embodiments, each entry includes a relevant party notification list 255 that provides a name listing with contact information (e.g., emails and phone numbers) for each relevant party (i.e., parties having an interest in one or more of the cargo, vessel, and/or operator) to any incidents involving the security of the particular shipment. When an incident involving potential liability and financial costs to one or more of the insured shipping entities occurs, the relevant parties list is expanded to include the insurance carrier and insurance adjusters. In one or more embodiments, operator/carrier insurance/risk information can include historical information linking the particular carrier or operator to a risk factor (e.g., cost to shipper or insured) that is based on the number of incidents (i.e., events involving unexpected or unapproved unsealing of the ARM device) reported over a period of time or for a number of shipments.

Referring again to FIG. 2, I/O controllers 240 support connection by and processing of signals from one or more connected input device(s). I/O controllers 240 also support connection with and forwarding of output signals to one or more connected output devices. I/O controllers 240 can also provide a device interface to which one or more removable storage device(s) (RSD(s)) 242 can be received. In one or more embodiments, RSD 242 is a non-transitory computer program product or computer readable storage device. In accordance with one embodiment, the functional modules (e.g., ARM device tracking module 212) described herein and the various aspects of the disclosure can be provided as a computer program product. The computer program product includes one or more RSDs 242 as a computer readable storage medium on which is stored program code of ARM device tracking module 212. When executed by a processor (e.g., CPU 205), the program code of ARM device tracking (and responding) module 212 causes the processor to implement the SMS server functions described herein, including, but not limited to, the features illustrated within method 700 of FIG. 7, which is described below.

SMS server 110 further includes network interface device (NID) 260, which enables SMS server 110 and/or components within SMS server 110 to communicate and/or interface with other devices, services, and components that are located external to SMS server 110. In one or more embodiments, SMS server 110 connects to remote database (DB) 280, via external communication network(s) 150, using one or more communication protocols. Remote DB 280 can be a cloud storage, in one embodiment, and can include a copy of event tracking repository (114). Remote DB 280 can also include a copy of ARM device log 285, which may mirror the log stored on the ARM device 125 of detected events recorded over a period of time. For purposes of discussion, communication network 150 is indicated as a single collective component for simplicity. However, it is appreciated that communication network 150 can comprise one or more direct connections to other devices as well as a more complex set of interconnections as can exist within a wide area network, such as the Internet.

SMS server utility (212) includes program code of ARM device tracking module 212 that execute on CPU 205 to configure SMS server 110 to performs functions that include receiving ARM device event data, compile the received event data, and create data entries within an event tracking repository. Processor execution of the ARM device tracking and responding module configures the at least one SMS server to perform the processes indicated as method 700 depicted by FIG. 7.

Accordingly, with ongoing reference to FIGS. 1A-1B and 2, one or more embodiments of the disclosure provides a container access door sealing and monitoring (CADSM) system. The CADSM system includes a SMS server 110 which performs the main functional features of the CADSM system. The SMS server 110 includes a memory having stored thereon program instructions for enabling the concurrent tracking of a plurality of different shipments each comprising cargo in a sealable container being transported by one or more operators of one or more transport vessels from an origination point to at least one destination point, the program instructions further comprising an access reporting and monitoring (ARM) device monitoring module for tracking and reporting on an operating state of a plurality of ARM devices, each deployed with a respective sealable container to track a sealed and unsealed state of a locking mechanism (e.g., a door latching system) of the container. The SMS server 110 includes a communication subsystem that enables the SMS server to communicatively connect via one or more networks to secondary devices including a first intermediary communication device co-located with a first container having a first ARM device assigned to monitor the access seal of the first container, the first intermediary communication device communicatively connected to the first ARM device and receives ARM device status information and seal/unseal messages via short range wireless communication from the first ARM device and reports a sealed and unsealed status of the access door, as detected by ARM device, within messages transmitted to the SMS server. The SMS server 110 also includes a processor communicatively connected to the memory and to the communication subsystem.

The processor 205 processes the program instructions, which configures the SMS server to receive a first ARM device message comprising an identifier (ID) of the first ARM device, a time and location at which the first ARM device was activated, and identifying information about a shipment being sealed by the first ARM device, including operator information. The processor stores information from the first ARM device message in a repository, along with an indication of an expected location and time at which the first ARM device should report the container access door being unsealed. The processor initiates tracking of the shipment and associated first ARM device as a shipment monitoring security function. In response to receiving a second ARM device message with the ID of the first ARM device, where the second ARM device message indicates an unsealed status of the access door being monitored by the first ARM device, the processor parses the second ARM device message for information related to an actual time and location at which the ARM device detected the unsealing of the access door. The processor compares the actual time and location to the expected time and location. In response to the actual time and location not being within a threshold range of the expected time and location, the processor: determines that an unexpected unseal event has occurred with the shipping container; and generates and transmits notifications alerting at least one interested party identified with the shipment and the operator of the unexpected unseal event.

In one or more embodiments, in transmitting the notifications, the processor configures the SMS server to transmit an alert to a mobile terminal of the operator, the alert indicating a potential theft of the content within the container (e.g., cargo). In one or more embodiments, in transmitting the notifications, the processor configures the SMS server to transmit a request to the operator to capture and provide one or more pictures or video of the ARM device in real time and provide secondary information to confirm whether the access door monitored by the AMR device was unsealed and whether the cargo has been tampered with or stolen. In one or more embodiments, the processor further configures the SMS server to, in response to receiving the one or more pictures or video and the secondary information indicating the ARM device was unsealed, generate an incident report to include the pictures and video and secondary information and the actual time and location the event was detected. The processor configures the SMS server to transmit the incident report to at least one additional interested party from among a group that includes a shipper, a recipient of the cargo, an insurance company, and law enforcement. The processor updates the repository with details of the incident report.

In one or more embodiments of the system, the ARM device is configured to operate as a monitoring and reporting device for the access door seal. In one or more embodiments, the short-range communication is via Bluetooth low energy (BLE) transmission to an intermediary device. In one or more embodiments, the access door seal comprises a cable seal and the ARM device detects and reports to the intermediary device any detected cutting of the cable seal and any tampering with the ARM device after the cable seal has been attached to the access door of the container. In one or more embodiments of the system, the processor receives the first and the second ARM device messages from an intermediary device that is a BLE receiving device communicatively coupled via BLE connection protocol to the ARM device.

According to another aspect of the disclosure an access reporting and monitoring (ARM) device is provided. The ARM device 125 includes a short-range communication transceiver module that enables the ARM device to communicatively connect via wireless communication with an intermediary device that receives and stores information about a seal and unsealed status of the ARM device while within a signaling range of the short range communication transceiver module. The ARM device includes a persistent memory having stored thereon a unique identification (ID) of the ARM device, one or more incident notification codes, each providing an encoded notification of a different event detected and/or recorded by the ARM device, and an access detection (AD) application. The ARM device includes or is associated with a mechanism for sealing or securing the ARM device to a locking mechanism of a container and a mechanism for detecting a sealed and an unseal status of the ARM device. The ARM device further includes a controller communicatively coupled to the transceiver module, the persistent memory, and the seal/unsealed detection mechanism. The controller processes program code of the AD application to enable the ARM device to detect and report, via the transceiver module, a time and location when the ARM device enters into a sealed state. The ARM device further detects and reports, via the transceiver module, a time and location and type of activity occurring with the ARM device that indicates one or more of a tampering with or an unsealing of the mechanism for sealing the ARM device.

In one or more embodiments, the transceiver module is a Bluetooth (BT) transceiver module, the short-range communication is Bluetooth Low Energy (BLE) communication, and the BT transceiver comprises a BLE transmitter and antenna that transmits BT signals from the BLE-enabled ARM device to a BT receiving device (130) within a range of the BLE signal. In one or more embodiments, the persistent memory comprises one or a flash memory and a random access memory (RAM). In one or more embodiments, the persistent memory comprises at least one of an OEM unique ID or a customer batch unique ID prepared for a specific customer.

Figure 3A:
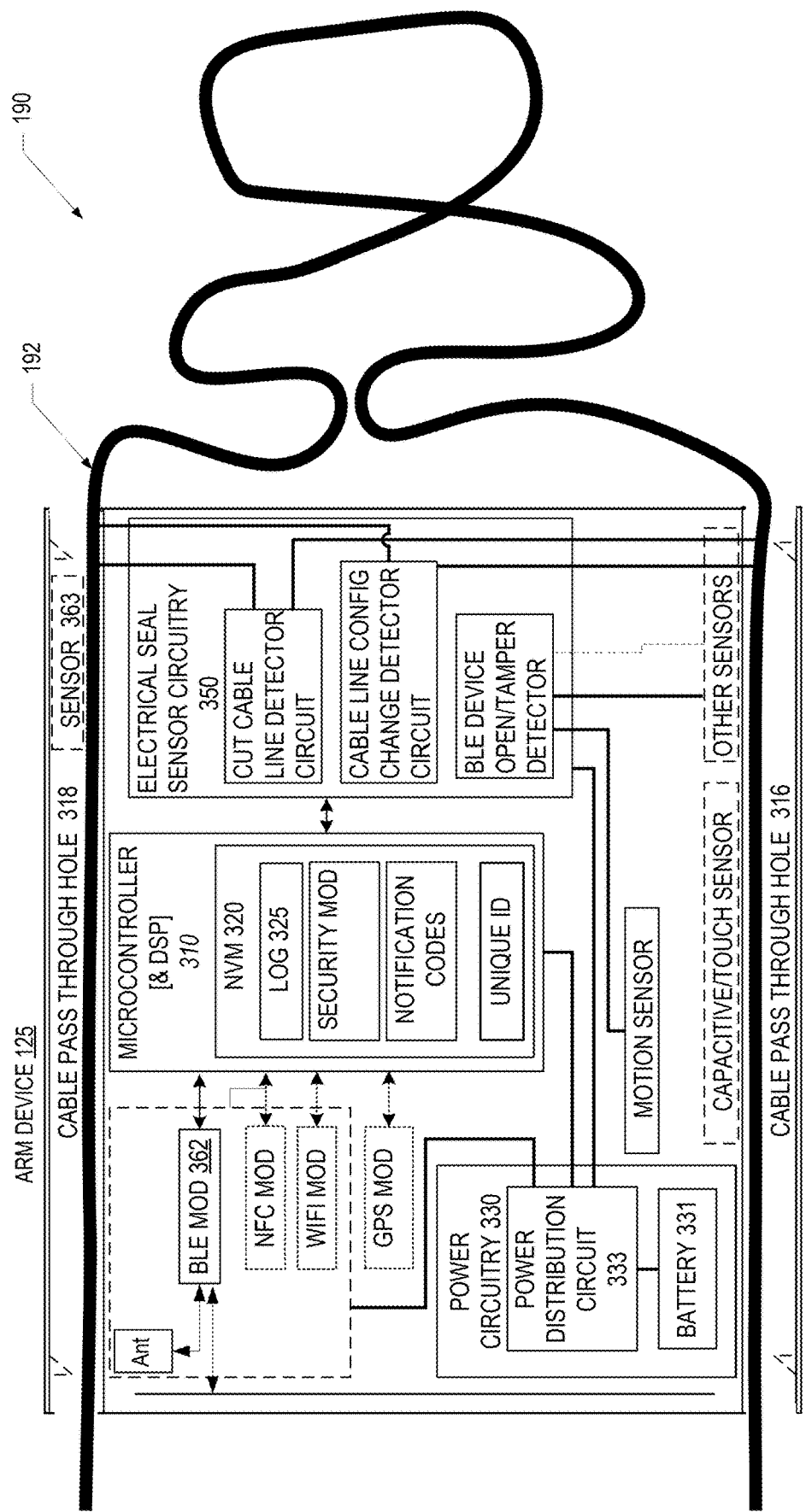
FIG. 3A is a block diagram illustrating the component makeup of an example cable locking access security device that includes an example BT-enabled ARM device, according to one or more embodiments.

As provided in several of the illustrative embodiments, the short-range communication features of ARM device 125 can be/are accomplished via BLE transmission, presenting the device as a BLE-enabled ARM device. FIG. 3A is a block diagram illustrating the component makeup of an example cable locking access security device 190 that includes an example BT-enabled ARM device 125, according to one or more embodiments. According to one or more aspects, and as illustrated by FIG. 3A, the ARM device includes a BLE module 362 having a BT transmitter connected to an antenna that transmits BLE signals from the ARM device 125 to a BT receiving device (130, FIGS. 1A, 1B) within a range of the BLE signal. The ARM device 125 includes a persistent memory (e.g., flash and RAM) 320 having stored thereon a unique identification (ID) of the BLE device, one or more incident notification codes, each providing an encoded notification of a different event detected and/or recorded by the ARM device, and an access monitoring and reporting (ARM) module/application. The unique ID can be an OEM unique ID or a customer batch unique ID prepared for a specific customer.

According to one or more embodiments, the ARM device 125 includes two pass-through holes 316, 318 that allow for the beginning end and the terminal end of the cable 192 provided with (or as a part of) the cable seal device 194 to be passed through the AMR device 125. The pass-through holes 316, 318 include electrical conductors that are electrically connected to a sensor circuit 350 that can detect a closed circuit, an open circuit, and changes in resistance or other electrical changes that occur with electrical characteristics of the cable monitored by ARM device 125. The cable 192 utilized with the cable seal includes a conductive component/wire that extends from the beginning end to the terminal end of the cable. The conductive component/wire thus enables transmission of electrical pulses through the cable when the conductive component/wire is electrically coupled to the electrical conductors within the pass-through holes 316, 318. The ARM device 125 can also include one or more additional sensors that also detect when a specific trigger condition occurs involving one or both of the ARM device 125 and the cable 192, such as the cable 192 being cut or moved or the ARM device 125 being tampered with, which conditions can result in or manifest changes in one or more electrical or other characteristics (e.g., signal blocking) being monitored.

According to one aspect, the trigger conditions can include, but are not limited to, detection of a cut in the attached security cable, detection of an opening of the ARM device, detection of an increasing of a length of the security cable, loss of connectivity of the security cable to one or both cable receptacles of the ARM device, vertical movement of the ARM device beyond a threshold distance from a resting location after the seal is triggered/activated, signal interference indicative of a blocking of a BT transmission or a person holding or touching the ARM device, etc. Some of the trigger condition can be time sensitive, i.e., including a threshold time for detecting the event relative to when the seal is applied and/or when the vehicle arrives at the intended destination.

According to one aspect, the ARM device 125 includes a power source/circuitry 330 having a battery 331 and a power distribution circuit 333 that powers each sub-component within the ARM device 125 that required electrical power. The controller monitors a power level of the power source and transmits the power level to a connected BT receiver or BLE receiving device 130 to which the ARM device 125 is paired. In one embodiment, the battery is a non-rechargeable Lithium cell; However, it is appreciated that a rechargeable version of the device can also be provided that enables the batteries to be recharged via a micro-USB charging port. Other types of long-life batteries that do not require FDA certification and notification can be utilized. Accordingly, execution of the ARM operating module also configures the ARM device 125 to: monitor a voltage level of a local battery 331 of the ARM device; and embed the voltage level in the BLE signal or log 224 transmitted to the BLE receiver device 130. According to one embodiment, the process also includes: comparing a current power level to a threshold low power level; and generating a BLE power signal indicating, to the BLE receiver device 130, a low power state of the battery of the ARM device, independent of any event-triggered transmission. According to one aspect, the ARM device 125 is reusable with the same or different cable seal until the battery is exhausted.

According to one aspect, the ARM device is a 3-dimensional device that has internal functional and processing components surrounded by an external casing with seals that make the device impenetrable to dust and other debris and to water/liquid. The ARM device is configured to have an ingress protection (IP) 67 or IP67 rating. Thus, in standard applications where the ARM device 125 is attached to the rear access doors of a container, the device is protected from environmental conditions to which the device is exposed while transiting across different terrains and geographic regions. In one implementation, the device can be further protected by extending the device into the container with the cable passing between the doors creating a sealed access through the rubber seal at the connecting edges of both doors. As one additional aspect, the ARM device 125 is configured to provide firmware flexibility and thus capable of being deployed with different platforms or devices, e.g., cellular phones, having different operating systems. As an example, the ARM device 125 exhibits compatibility with phones or tablets through SDK/APK/API. Additionally, the ARM device 125 includes the ability to communicate/integrate with other Bluetooth-enabled 3rd party internet of things (IOT) devices.

The ARM device 125 also includes a controller 310 that executes code of the ARM module/application 321 to enable the ARM device to perform a plurality of functions, including, but not limited to: pair the BLE module of the ARM device to a BT receiving device 130 within a target range of the ARM device 125; receive signals from the one or more sensors, the signals generated in response to an occurrence of at least one of the one or more trigger conditions; identify which condition is being detected or identified by the received signal; record the detected event with time and location data within a log 325 of events; turn on the BLE transmitter circuit (if the circuit is not currently on); generate/select an encoded BLE signal identifying the specific condition/event being detected and signaled and encoding the time and location of the detection of the event; forward the encoded BLE signal to the paired BT receiver device 130; update the log 325 of detected events and forward the updated log of detected events to the BT receiver device 130. In one or more embodiments, the payload of the BT signal can include the BT device ID, the signal strength (RSSI) measurement, a battery voltage status, the cable status (intact, cut, severed, tampered, etc.), and other relevant data.

FIG. 3B provides an example event data log 325 of an BLE-enabled ARM device, presenting a log of events related to the sealing and subsequent access(es) to a shipment container to which the ARM device is attached as an access monitoring seal, according to one or more embodiments. As shown, log 325 includes a description of the possible detected events as well as a corresponding code that is assigned to uniquely identify the occurrence of that event. Each code is then further encoded with a hash function that prevents an interloper from capturing the BLE signal and deciphering the messages being communicated by the BLE signals. Date, time, and location data are also determined at the time of each detected event, and that additional data is stored along with each event detected. A copy of this log 325 is transmitted to the BLE receiving device 130, which forwards the log data to SMS server 110. SMS server 110 then maintains the copy of the log data (285, FIG. 2) in the ARM device entry within the ARM device tracking DB 114 of SMS server 110.

Each ARM device 125 can be assigned a unique ID or serial number or with a batch number that can be customized for specific types of use or for specific customers. The unique ID can then be used as a part of the information use to encode the transmitted BT messages. The unique ID can also be used to identify the specific shipping container from other containers with ARM devices in the same general vicinity, and which are detectable by the BT receiver device 130.

Accordingly, as related to device communication of the events, the device generates and communicates encoded BLE communication messages, which includes: a device unique BLE ID, the signal RSSI, voltage level of the battery, a current status of the cable (e.g., connected, cut, not connected), and optionally, a cable seal ID. Additionally, the alerts, notification and/or log features provided by the ARM device can include: communicating a beacon when the cable is disconnected or has been cut; communicating a cable connection status when the ARM device is out of coverage from a "parent device"; communicating battery data, which includes the amount of battery power remaining.

Figure 4:
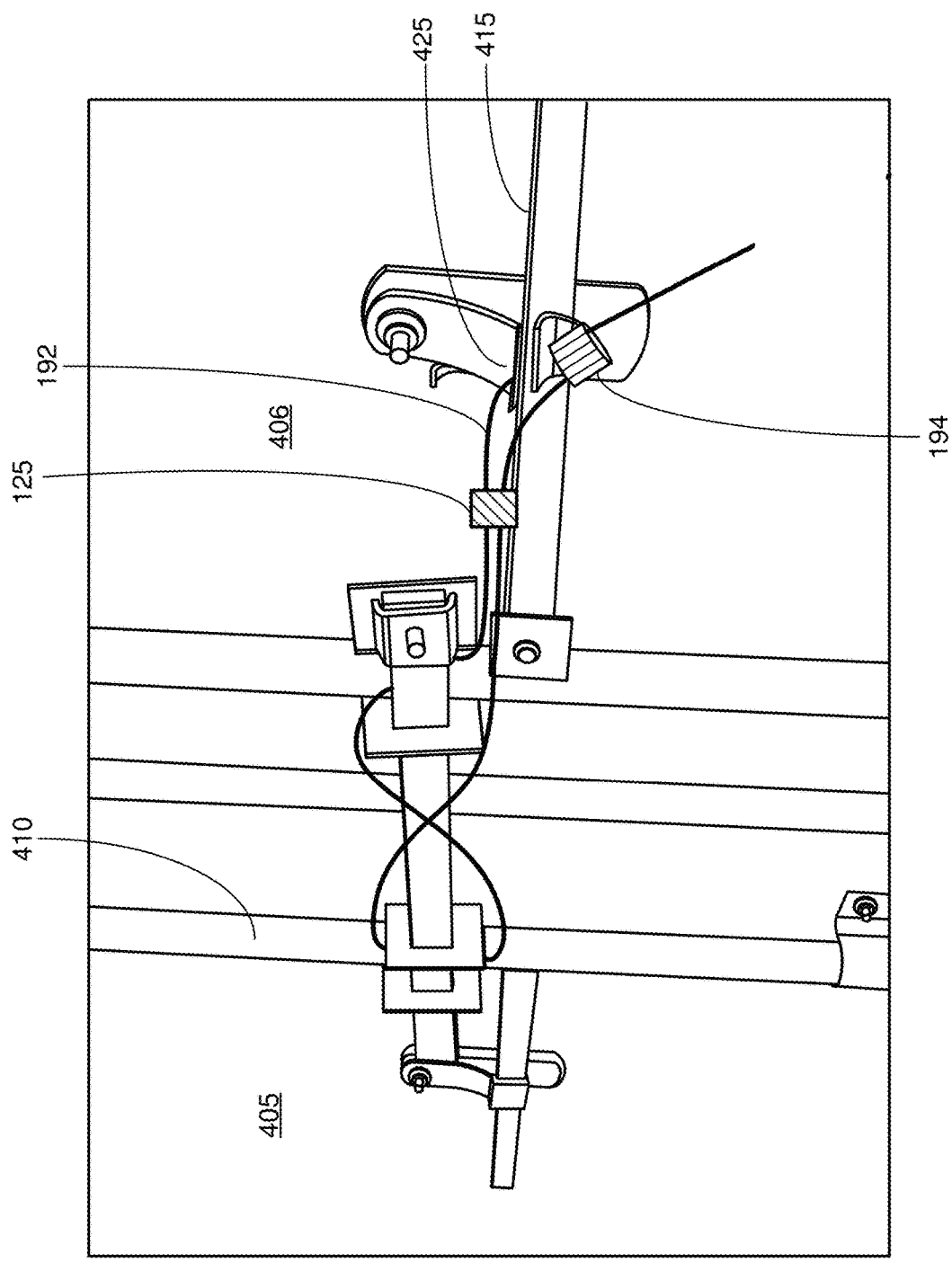
FIG. 4 is a diagram illustrating an example application of a cable locking security device enhanced with a BT-enabled ARM device utilized to lock, secure, and track access to a shipping container, according to one or more embodiments.

FIG. 4 is a diagram illustrating an example application of a cable locking security device 190 enhanced with a BT-enabled ARM device 125 and which is utilized to seal an access mechanism (e.g., a lock or handle), and enable ARM device 125 to track and report on unsealing of the access door to a shipping container, according to one or more embodiments. As shown, the security cable 192 of the cable locking mechanism 190 is attached to lockrods 410 and handles 415 affixed by hinges 425 to the left and right panel doors 405, 406 of the container. The top and/or bottom ends of the lockrods are configured as cams (not shown) that engage with cam keepers affixed to a top and bottom frame of the container. The lockrods include levers that operate as rotatable door handles. The ends of the door handles are received into door handle retaining latches 425 that are bolted or riveted to the door panel and which slide over the door handle to prevent movement of the door handle when in this locked position. The cable locking mechanism 190 is wrapped in a FIG. 8 configuration or other intertwined configuration around the engaging cross bars and through the holes of the latches holding the handles of the lockrods to prevent the panels from being opened without physically removing or cutting the cables of the cable locking security device. The security cable 192 is extended through the cable holes in the ARM device before the cable 192 is sealed using an end seal component 194 (e.g., a CAM), such that the ARM device 125 has electrical connection with the cable and can detect when the security cable 192 is cut or otherwise opened to allow the panel doors to be opened and provide access to the container.

According to one aspect, the security cable 192 is of a length that is long enough to extend through the door handles, retainers, and wrap around the door rods to form an intertwined formation of the cable, such that the cable 192 would need to be cut for the doors to open. The length of the security cable used can differ based on the parameters of the door attachment parts and the number of loops of the cable being used to complete the wrap. Additionally, given that the cable provides a deterrent to opening the door, the cable is of a type of material(s) that is difficult to cut. In one or more embodiments, a wide diameter cable can be used to make cutting the cable more difficult. In the described embodiments, the cable includes an interior metal conductor that enables an electrical current to flow through the cable when both ends are connected to the receiving receptacles/conductors (316, 318, FIG. 3A) of the ARM device 125. The electrical signal is monitored by the ARM device 125. Any momentary loss in the signal or abrupt change in the level of the electrical signal can be indicative of a cut in the cable or tampering with the cable. This event is then recorded within the event log 325 (FIG. 3A) as an incident that is a triggering condition. Additionally, in one or more embodiments, an unwinding of the cable from the wrapped configuration or an extension of the cable beyond the initial length to maintain the doors in the closed position can be detected electrically by one or more sensors, e.g., as a difference in capacity or other change in electrical characteristics being monitored by a capacitive sensor or other sensor. A person touching the ARM device or cable can also be detected using one or more sensing techniques, including capacitive sensing. This change is then recorded within event log 325 as an incident that can be one of the trigger conditions.

According to another aspect of the disclosure, and as shown by FIGS. 1A, 1B, the ARM device establishes a BLE pairing with a BLE receiver device 130. As specifically shown by FIG. 1A, BLE receiver device 130 can be an operator mobile communication device (MCD) 170 or an electronic logging device (ELD) 175, both of which are equipped with a BT wireless transceiver that enables connection to and communication with the BLE-enabled ARM device 125 via BLE transmission. In one or more embodiments, a BLE security application is downloaded onto (or otherwise installed on) the BT receiving device 130 and the functionality thereof is executed by the BT receiving device 130. The BLE security application receives the BT signal from the ARM device 125 and may, in one embodiment, decode the BT signal for local notification and response. The processor of the receiving device is then able to output, via one or more output devices (e.g., audibly, via speakers and/or visually, via a display) contemporaneous information about the status of the ARM device 125 and cable 192. The MCD 170 and/or ELD 175 includes a display device with a graphical user interface (GUI) 172 for presenting specific text or images as notifications of the status.

According to one or more embodiments, The MCD/ELD 170/175 includes (i) a memory having stored thereon an ARM device pairing/monitoring/tracking module and a wireless network communication module, (ii) a communication interface enabling communication with external devices via a network, including SMS server 110, and (iii) a storage that stores data and other information. The MCD/ELD 170/175 also includes a processor that is communicatively coupled to each of the BT transceiver, the wireless communication transceiver, the display device, the memory, the communication interface, and the storage.

In one or more embodiments, the BT receiver device 130 encodes the received BT signal. The encoded BT signal is then transmitted via the communication and data network to a monitoring server, SMS server 110, which decodes the received encoded signal. Additionally, in one embodiment, the receiving device 130 communicates, via an external network, to a shipment tracking service, any important additional security details of the ARM device and security status, such as the GPS location, etc. At the SMS server 110 (or at BT receiver device 130, in some embodiments), the decoded message data is then mapped to a table of triggering conditions and operational states/status to track the events occurring with respect to access security for the specific shipment.

Figure 5:
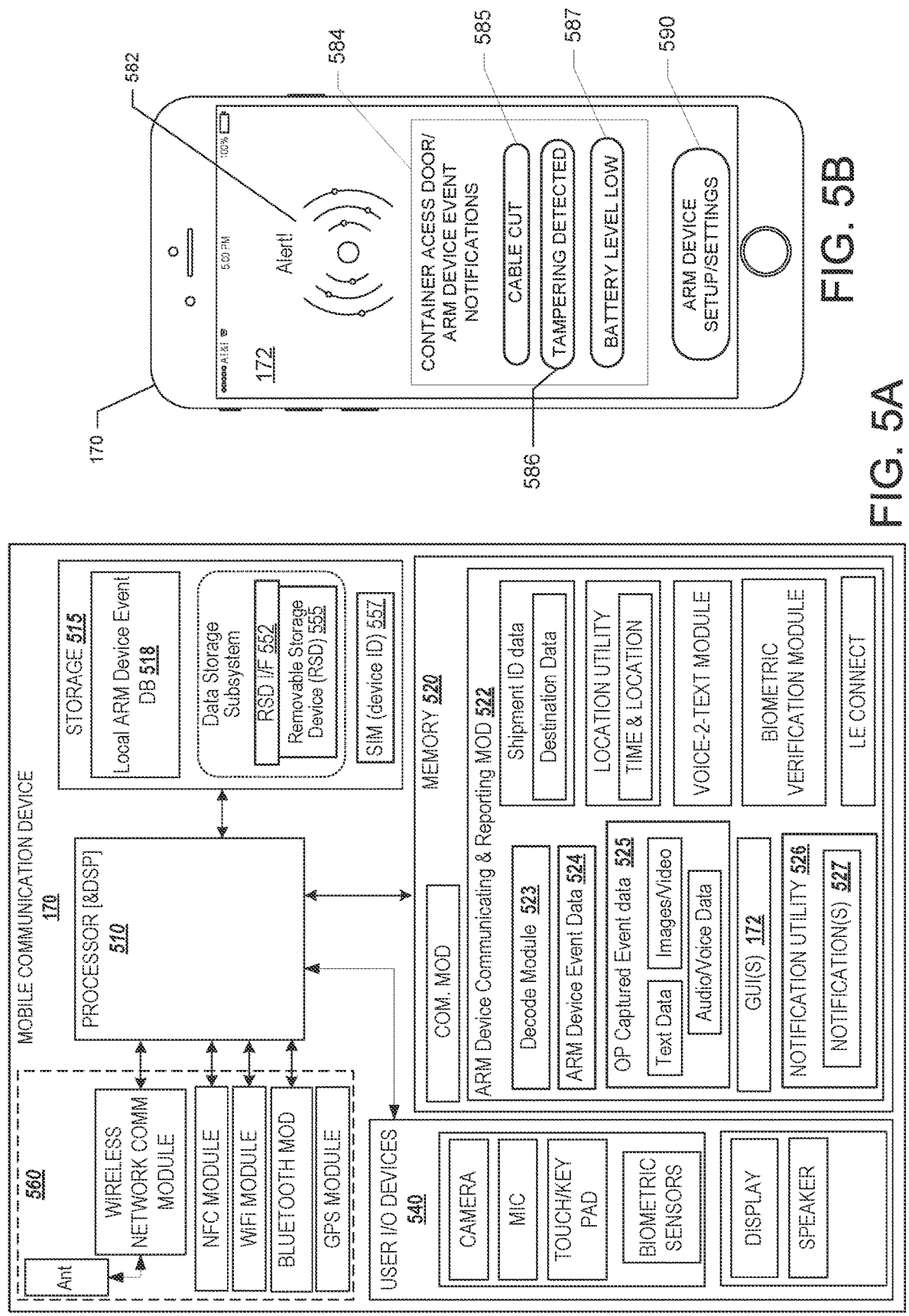
FIG. 5A presents example component makeup of an example operator mobile terminal that operates as a BLE receiver device, according to one or more embodiments.
FIG. 5B is a diagram depicting a display of an operator mobile terminal presenting a user interface with alert messages generated and surfaced to an operator of a transport vehicle based on short range communication signals received from an ARM device and notifications received from an SMS server, according to one or more embodiments.

Turning now to FIG. 5A, there is illustrated a block diagram representation of component makeup of an example operator MCD 170. Operator MCD 170 can be any mobile communication device that can provide the features described herein. Operator MCD 170 operates within a wireless communication network and serves as both the data processing and communication device within which several of the operator-associated features of the disclosure can be implemented. According to one aspect, operator MCD 170 is designed to communicate with other devices via a wireless communication network, which is generally presented as being included within communication/data network 150 (FIGS. 1A and 1B). MCD 170 can be one of a plurality of different types of devices, including but not limited to, a mobile cellular phone or smart-phone, a laptop, a net-book, an ultra-book, and/or a tablet (e.g., an iPAD®), or other computing device configured to enable wireless connectivity. MCD 170 includes the necessary hardware and software to enable wireless-enabled communication between MCD 170 and a wireless infrastructure network that enables exchange or transmission of information and/or data and voice communication that are required to implement the various features described herein to facilitate incident detection, response, and reporting features, as described herein.

Referring now to the specific component makeup and the associated functionality of the presented components, MCD 170 comprises processor 510, which connects via a plurality of interconnects (illustrated by the bi-directional arrows) to a plurality of other functional components of MCD 170. Processor 510 can be an integrated circuit that includes one or more programmable microprocessors and a digital signal processor (DSP). Processor 510 controls the communication, program code execution, power mode control, time synchronization, and other functions and/or operations of MCD 170. These functions and/or operations thus include, but are not limited to, application data processing and signal processing.

Connected to processor 510 is storage 515, memory 520, input/output (I/O) devices 540, and communication interfaces 560. As provided, storage 515 contains local ARM device DB 518 that can include an entry of event data receive via BLE transmission from ARM device 125, in one or more embodiments. In one embodiment, storage 515 includes a removable storage device interface (RSD I/F) 552, which supports removable insertion of an RSD 555 on which computer instructions can be programmed to support the features of operator MCD 170 described herein. Storage 515 also includes a subscriber identification module (SIM) 557 or similar component that provides a unique device ID, operator information, and other contact information for operator MCD 170.

Memory 520 includes a plurality of modules and applications and data corresponding to the features of operator MCD 170 that support the use of ARM device 125 and associated security access features described herein. Specifically, memory 520 includes ARM device communicating and reporting module(s) 532. ARM device communicating and reporting module(s) 532 includes a plurality of submodules and data, such as illustrated within FIG. 5A. Among these modules and data are decode module 523, which decodes the received signals to provides ARM device event data 524. Operator captured event data 525 can be captured by the operator base on a request surfaced on the display for operator to investigate and provide additional data such as text, pictures, videos, and audio files explaining the event that was detected and reported by ARM device. In one embodiment, the request can be triggered from SMS server 110. One or more GUIs 172 are provided by ARM device communicating and reporting module(s) 532. Among the different possible GUIs 172 are those that present notifications 527 generated by notification utility 526 or received from SMS server 110.

ARM device communicating/reporting module 522 also includes shipment identifying data and a location utility that provides location and time data for operator MCD 170. In one or more embodiments, the execution of the ARM device communicating/reporting module 522 configures the MCD 170 (or similarly configured ELD 175) to configure the ARM device (during the ARM device setup and activation) with shipment ID data and/or time and location data that can be used to uniquely identify the BLE signal from other BLE signals within signaling range of and detectable by the MCD 170.

According to a plurality of embodiments, the processor 510 executes the ARM device communicating/reporting module 522, which configures the MCD (or an ELD, which may be similarly configured with module(s) 532) to detect the BLE signature of the ARM device, pair with the ARM device via the BLE signature, receive periodic status (event) signals from ARM device 125 as encoded signals over the established BT pairing, decode the received status signals, identify when the received status signal indicates a security condition exists (e.g., an unexpected unseal event or tampering with ARM device or associated cable), generate and locally output a notification of the security condition, and transmit the status information to update a remote SMS server 110 with relevant data/information from the encoded status signals received and decoded. In one or more embodiments, the operator MCD 170 transmits the encoded status information to the SMS server 110, and the SMS server 110 then decodes the information and responds accordingly to the decoded status.

FIG. 5B is a diagram depicting a display of an operator mobile terminal 170 presenting a user interface 172 with different alert messages that can be generated and surfaced to an operator of a transport vehicle based on short range communication signals received from an ARM device and notifications received from an SMS server, according to one or more embodiments. With the illustrated embodiment, the user interface is a graphical user interface (GUI). As shown, a first example GUI 172 can provide an alert 582 and several different available notifications 584 presenting specific details about the status of the container access door as detected by ARM device. The notifications can include cable cut 585, detected tampering 586, low battery level 587. GUI 172 further presents a selectable option 590 for setting up specific features of ARM device 125.

With respect now to the flow charts, within each flow chart, certain features that are considered optional can be presented in blocks having dashed lines. These features can be included in some embodiments and excluded in others. It is appreciated that the described aspects of the various methods can be fully automated, in one or more embodiments, or be partially automated in some embodiments. The flow charts present respective methods 600 and 700 that are performed by a respective one of controller 510 (FIG. 5A) and processor 205 (FIG. 2)

Figure 6:
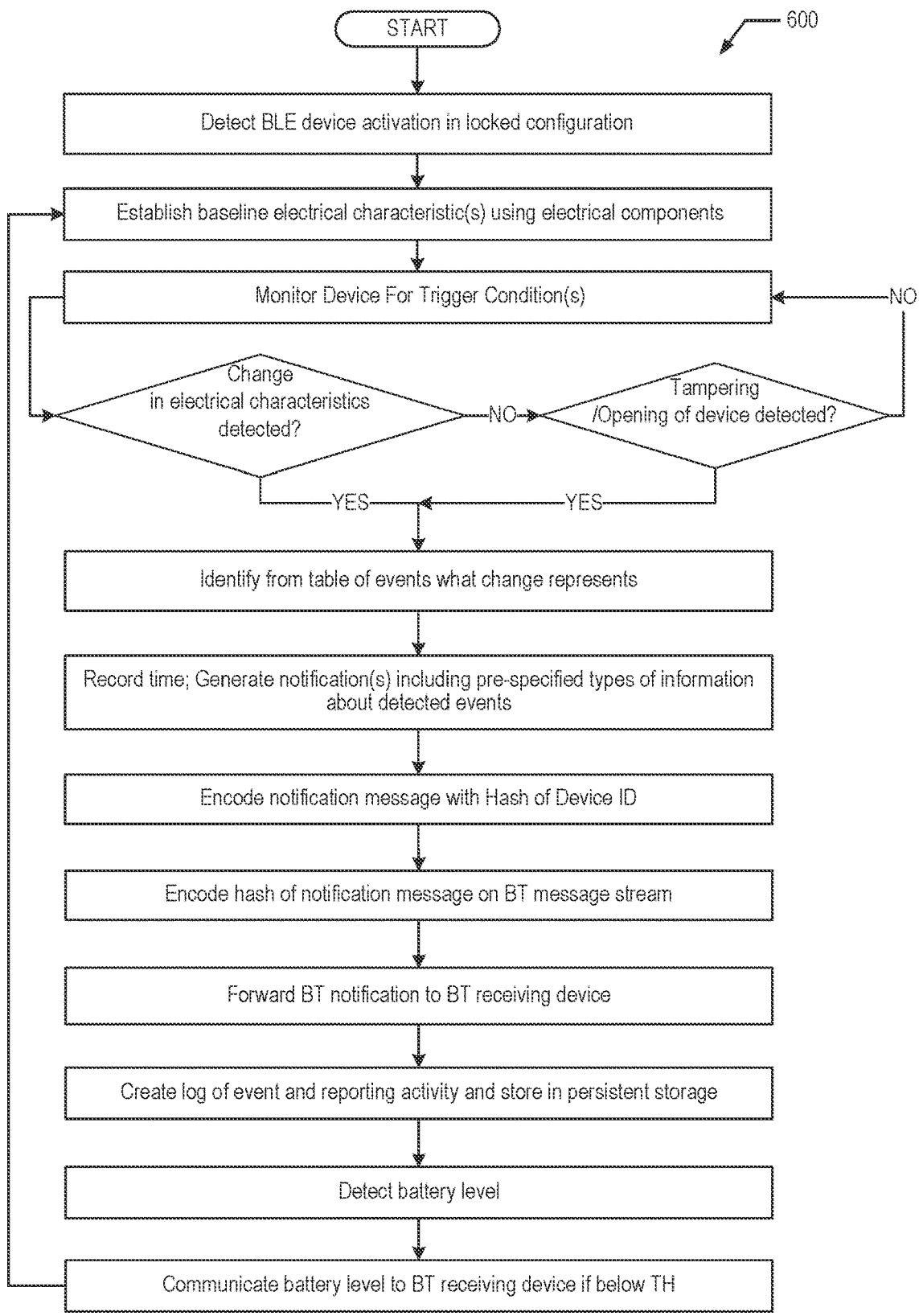
FIG. 6 depicts a flowchart of a method by which an ARM device operates to monitor a status of a cable locking seal to which the ARM device is electrically coupled in order to detect and report on events associated with an unsealing of or tampering with the cable locking seal and/or the ARM device being utilized to seal an access door/access point to a shipping container, according to one or more embodiments.

FIG. 6 depicts a flowchart of a method 600 by which an ARM device 125 operates to monitor a status of a cable locking seal to which the ARM device is electrically coupled in order to detect and report on events associated with an unsealing of or tampering with the cable locking seal and/or the ARM device being utilized to seal an access door/access point to a shipping container, according to one or more embodiments.

Figure 7:
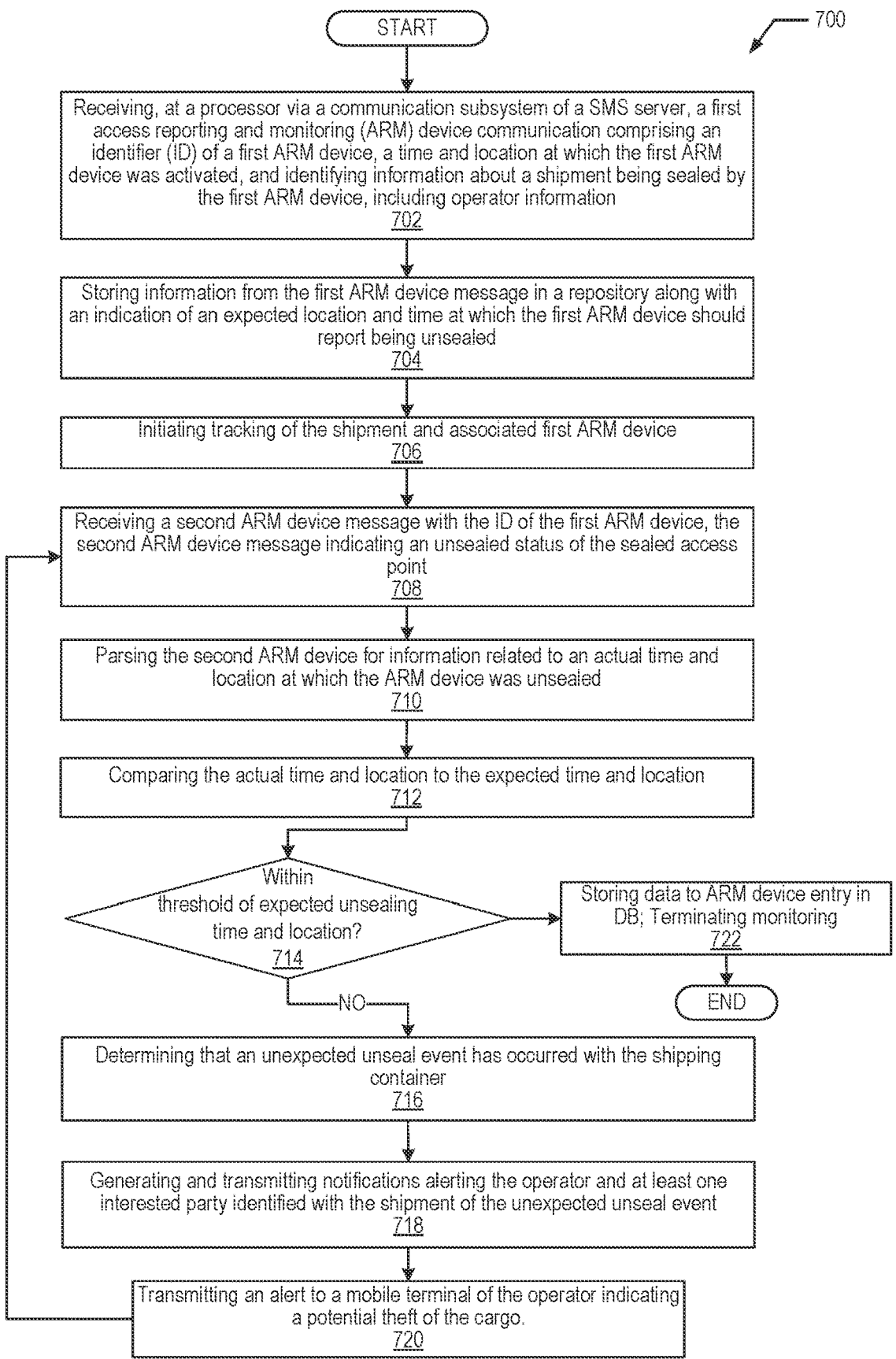
FIG. 7 presents a flowchart of a method by which an SMS server receives and responds to access information from a deployed ARM device for a particular shipment, according to one or more embodiments.

FIG. 7 presents a flowchart of a method 700 by which an SMS server receives and responds to access door seal/unseal information from a deployed ARM device 125 for a particular shipment, according to one or more embodiments. Some aspects of method 700 are described with reference to the components of FIGS. 1 and 2. At block 702, method 700 includes receiving, at a processor (205) via a communication subsystem (e.g., NID 260) of a SMS server, a first access reporting and monitoring (ARM) device communication (message) comprising an identifier (ID) of a first ARM device, a time and location at which the first ARM device was activated, and identifying information about a shipment being sealed by the first ARM device, including operator information. Method 700 includes storing information from the first ARM device message in a repository along with an indication of an expected location and time at which the first ARM device should report the container access door being unsealed (block 704). It is appreciated that, as provided by the illustrative embodiments, the messages are received via the intermediary devices, including one or more BLE signal receiving devices 130, and a specially configured BLE receiving device 126 (FIGS. 1A, 1B) that is programmed to transmit the received messages to the SMS server 110. Method 700 includes initiating tracking of the shipment and associated first ARM device as a shipment monitoring security function (block 706). Method 700 includes, receiving a second ARM device message with the ID of the first ARM device, the second ARM device message indicating an unsealed status of the access door being monitored by the first ARM device (block 708). Method 700 includes, in response to receiving the second message, parsing the second ARM device for information related to an actual time and location at which the ARM device detected the unsealing (block 710). Method 700 further includes comparing the actual time and location to the expected time and location (block 712). Method 700 includes determining whether the time and location are within a threshold time and location (block 714). In response to the actual time and location not being within a threshold range of the expected time and location, method 700 includes determining that at least one of an unexpected and an unscheduled unseal event has occurred with the shipping container (block 716). And method 700 further includes generating and transmitting notifications alerting the operator and at least one interested party identified with the shipment of the unexpected or unscheduled unsealing event (block 718).

In one or more embodiments, transmitting the notifications further includes transmitting an alert to a mobile terminal of the operator, the alert indicating a potential theft of the cargo (block 720). At block 714, in response to the time and location being within the threshold time and location, method 700 includes storing the data to the entry within the ARM device tracking DB and terminating monitoring of the ARM device (block 722).

In one or more embodiments, transmitting the notifications further includes transmitting a request to the operator to capture and provide one or more pictures or video of the access door, cable seal, and the ARM device in real time and provide secondary information to confirm whether the access door was unsealed and whether the cargo has been tampered with or stolen.

According to one or more embodiments, the method 700 further includes in response to receiving the one or more pictures or video and the secondary information indicating the access door was unsealed, generating an incident report to include the pictures and video and secondary information and the actual time and location the event was detected. The method 700 further includes transmitting the incident report to at least one additional interested party from among a group comprising a shipper, a recipient of the cargo, an insurance company, and law enforcement. The method 700 further includes updating the repository with details of the incident report.

In the above-described flow charts, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In at least one embodiment, aspects of the disclosure are provided as a computer program produce that includes a computer readable medium and program code stored on the computer readable medium that when installed on and executed by a processor of a computer device, such as the MCD or SMS server, having a display configures the computer device to respectively perform the method functions illustrated herein.

As further described herein, implementation of the functional features of the disclosure described herein can involve use of a combination of hardware, firmware, as well as several software-level constructs (e.g., program code and/or program instructions and/or pseudo-code) that execute to provide a series of methods that present the different features and functions of the disclosure. As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

In the above description, exemplary embodiments in which various aspects of the disclosure may be practiced are described in general detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof. Other aspects of the disclosure that stem from and/or are extensions of the above described processes are presented generally within the aforementioned descriptions and/or the figures accompanying this submission. Nothing within the present descriptions are to be taken as limiting on the scope of the greater application of the disclosure within the shipping and transportation industry/space.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

While the disclosure has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. Many modifications and variations will be apparent to those of ordinary skill in the art without departing from the scope and spirit of the innovation. The described embodiments were chosen and described in order to best explain the principles of the innovation and the practical application, and to enable others of ordinary skill in the art to understand the innovation for various embodiments with various modifications as are suited to the particular use contemplated.

What is claimed is:

1. A container access door sealing and monitoring (CADSM) system comprising:
    a shipment monitoring service (SMS) server comprising:
        a memory having stored thereon program instructions for enabling concurrent tracking of a plurality of different shipments each comprising cargo in a sealable container being transported by one or more operators of one or more transport vessels from an origination point to at least one destination point, the program instructions further comprising an access reporting and monitoring (ARM) device monitoring module for configuring the SMS server to track and report on an operating state of a plurality of ARM devices, each ARM device deployed with a respective container to track a sealed and unsealed state of a cable locking mechanism comprising a cable intertwined around and affixed to secure both sides of an access door of the container;
        a communication subsystem that enables the SMS server to communicatively connect via one or more networks to secondary devices including a first intermediary communication device co-located with a first container having a first ARM device assigned to monitor a seal and unsealed status of the cable locking mechanism attached as an access door seal of the first container, the first intermediary communication device communicatively connected via short range wireless communication to the first ARM device, receives ARM device status information and seal/unseal messages from the first ARM device, and reports a sealed and unsealed status of the access door, as detected and reported by the first ARM device, within messages transmitted to the SMS server; and
        a processor communicatively connected to the memory and to the communication subsystem, the processor processing the program instructions which configures the SMS server to:
            in response to receiving an ARM device message indicating an unsealed status of the access door seal being monitored by the first ARM device:
                parse the ARM device message for information related to an actual time and location at which the ARM device detected unsealing of the access door seal; and
                compare the actual time and location to an expected time and location at which a scheduled, authorized unlocking of the container is expected; and
            in response to the actual time and location not being within a threshold range of the expected time and location:
                determine that at least one of an unexpected or an unscheduled unseal event has occurred with the container; and
                generate and transmit notifications, via the communication subsystem, alerting at least one interested party identified with the shipment of the unexpected or unscheduled unseal event, wherein to transmit the notifications, the processor configures the SMS server to:
                    transmit a request to the mobile terminal for the operator to capture and provide one or more pictures or video of the access door, the seal, and the ARM device in real time and provide, along with the images, secondary information to confirm whether the access door was unsealed and whether the cargo has been tampered with or stolen; and
                    receive, via the communications subsystem, the secondary information confirming a current status of the access door seal.

2. The system of claim 1, wherein in transmitting the notifications, the processor configures the SMS server to:
    transmit an alert to a mobile terminal of the operator, the alert triggering the mobile terminal to output a notification indicating unscheduled unsealing of the access door seal and a potential theft of the cargo within the container.

3. The system of claim 1, wherein the processor further configures the SMS server to:
    in response to receiving the one or more pictures or video and the secondary information indicating the access door was unsealed:
    generate an incident report to include the pictures and video and secondary information and the actual time and location the event was detected;
    transmit the incident report to at least one additional interested party from among a group comprising a shipper, a recipient of the cargo, an insurance company, and law enforcement; and
    update a repository with details of the incident report.

4. The system of claim 1, wherein the processor further configures the SMS server to:
    receive a first ARM device message comprising an identifier (ID) of the first ARM device, a time and location at which the first ARM device was activated, and identifying information about the container with the access door seal being monitored by the first ARM device;
    store information from the first ARM device message in a repository along with an indication of the expected location and time at which the first ARM device should report the access door seal being unsealed; and
    initiate tracking of the shipment and monitoring for receipt of messages from the associated first ARM device as a shipment monitoring security function, each message received from the first ARM device tagged with the ID of the first ARM device.

5. The system of claim 1, wherein the first ARM device is configured to operate as a monitoring and reporting device for the access door seal, wherein the first ARM device is electrically coupled to an associated extended cable as a part of the cable locking mechanism that is intertwined and wrapped around or threaded through locking mechanisms of both panels of the access door to provide the access door seal that prevents an opening of either of the door panels of the access door without physically removing or cutting the cable of the cable locking mechanism, wherein a physical removal or cutting of the cable triggers the first ARM device to report an unsealing of the access door seal via transmission of a short range wireless communication comprising ARM device status information and an unseal event message.

6. The system of claim 1, wherein:
the ARM device communicates via Bluetooth low energy (BLE) transmission to an intermediary device that forwards the unseal event message information to the SMS server; and
the processor receives the ARM device messages from the intermediary device that is a BLE receiving device communicatively coupled via BLE connection protocol to the ARM device.

7. The system of claim 6, wherein the ARM device detects and reports to the intermediary device any detected cutting of the cable or any tampering with the ARM device after the cable has been intertwined around both of the handles for the two panels of the access door of the container and electrically coupled to the ARM device and the ARM device has been activated to start monitoring and reporting a status of the access door seal.

8. The system of claim 1, wherein the intermediary device is one of an operator mobile terminal and an electronic logging device.

9. The system of claim 1, wherein the first ARM device is configured to detect one or more trigger conditions from among detection of a cut in the attached security cable, detection of an opening of the ARM device, detection of an increasing of a length of the security cable, loss of connectivity of the security cable to one or both cable receptacles of the ARM device, vertical movement of the ARM device beyond a threshold distance from a resting location after the seal is triggered/activated, signal interference indicative of a blocking of a Bluetooth transmission or a person holding or touching the ARM device.

10. The system of claim 1, wherein:
the cable of the cable locking mechanism is twisted around engaging cross bars and through holes of latches holding handles of lockrods that lock respective door panels of the access door; and
the first ARM device is configured to detect and report removal, cutting, and tampering with one or more of the cable and the first ARM device.

11. The system of claim 1, wherein the processor further configures the SMS server to:
receive a copy of an event data log generated by the first ARM device, the event data log presenting a log of events related to a sealing time and location and subsequent accesses to a shipment container and events detected via the first ARM device, the event data log locally compiled and stored at the first ARM device until uploaded to the SMS server; and
store the copy of the event data log within an ARM device tracking database.

12. A method comprising:
receiving, via a communication subsystem of a SMS server, an ARM device message indicating an unsealed status of an access door seal being monitored by a first ARM device, the first ARM device deployed with a container to track a sealed and unsealed state of a cable locking mechanism comprising a cable intertwined around and affixed to secure both sides of an access door of the container; and in response to receiving the ARM device message indicating an unsealed status of the access door seal being monitored by the first ARM device:
parsing the second ARM device message for information related to an actual time and location at which the ARM device detected unsealing of the access door seal; and
comparing the actual time and location to an expected time and location at which a scheduled, authorized unlocking of the container is expected; and
in response to the actual time and location not being within a threshold range of the expected time and location:
determining that at least one of an unexpected or an unscheduled unseal event has occurred with the container; and
generating and transmitting notifications alerting at least one interested party identified with the shipment of the unexpected or unscheduled unseal event, wherein transmitting the notifications further comprises:
transmitting a request to the mobile terminal for the operator to capture and provide one or more pictures or video of the access door, the seal, and the ARM device in real time and provide, along with the images, secondary information to confirm whether the access door was unsealed and whether the cargo has been tampered with or stolen; and
receiving, via the communications subsystem, the secondary information confirming a current status of the access door seal.

13. The method of claim 12, wherein transmitting the notifications further comprises:
transmitting an alert to a mobile terminal of the operator, the alert triggering the mobile terminal to output a notification indicating unscheduled unsealing of the access door seal and a potential theft of content within the container.

14. The method of claim 12, further comprising:
in response to receiving the one or more pictures or video and the secondary information indicating the access door was unsealed:
generating an incident report to include the pictures and video and secondary information and the actual time and location the event was detected;
transmitting the incident report to at least one additional interested party from among a group comprising a shipper, a recipient of the cargo, an insurance company, and law enforcement; and
updating a repository with details of the incident report.

15. The method of claim 12, further comprising:
receiving a first ARM device message comprising a unique identifier (ID) of the first ARM device, a time and location at which the first ARM device was activated, and identifying information about the container with the access door seal being monitored by the first ARM device;
storing information from the first ARM device message in a repository along with an indication of an expected location and time at which the first ARM device should report the access door seal being unsealed; and
initiating tracking of the shipment and monitoring for receipt of messages from the associated first ARM device as a shipment monitoring security function, each message received from the first ARM device tagged with the ID of the first ARM device.

16. The method of claim 12, wherein the first ARM device is configured to detect one or more trigger conditions from among detection of a cut in the attached security cable, detection of an opening of the ARM device, detection of an increasing of a length of the security cable, loss of connectivity of the security cable to one or both cable receptacles of the ARM device, vertical movement of the ARM device beyond a threshold distance from a resting location after the seal is triggered/activated, signal interference indicative of a blocking of a Bluetooth transmission or a person holding or touching the ARM device.

17. The method of claim 12, further comprising:

receiving a copy of an event data log generated by the first ARM device, the event data log presenting a log of events related to a sealing time and location and subsequent accesses to a shipment container and events detected via the first ARM device, the event data log locally compiled and stored at the first ARM device until uploaded to the SMS server; and storing the copy of the event data log within an ARM device tracking database.

18. The method of claim 12, wherein:

the first ARM device is electrically coupled to the cable as a part of a cable locking mechanism, the cable intertwined and wrapped around the lockrods and handles of the left and right panel doors of the access door to secure both sides of the access door to provide the access door seal that prevents an opening of either panel doors of the access door without physically removing or cutting the cable of the cable locking mechanism, wherein a physical removal or cutting of the cable triggers the first ARM device to report an unsealing of the access door seal via transmission of a short range wireless communication signal comprising the ARM device message.

* * * * *